Nov. 16, 1926.  
P. MUELLER  
FAUCET CONNECTION  
Filed April 28, 1923  
1,607,096  
2 Sheets-Sheet 1
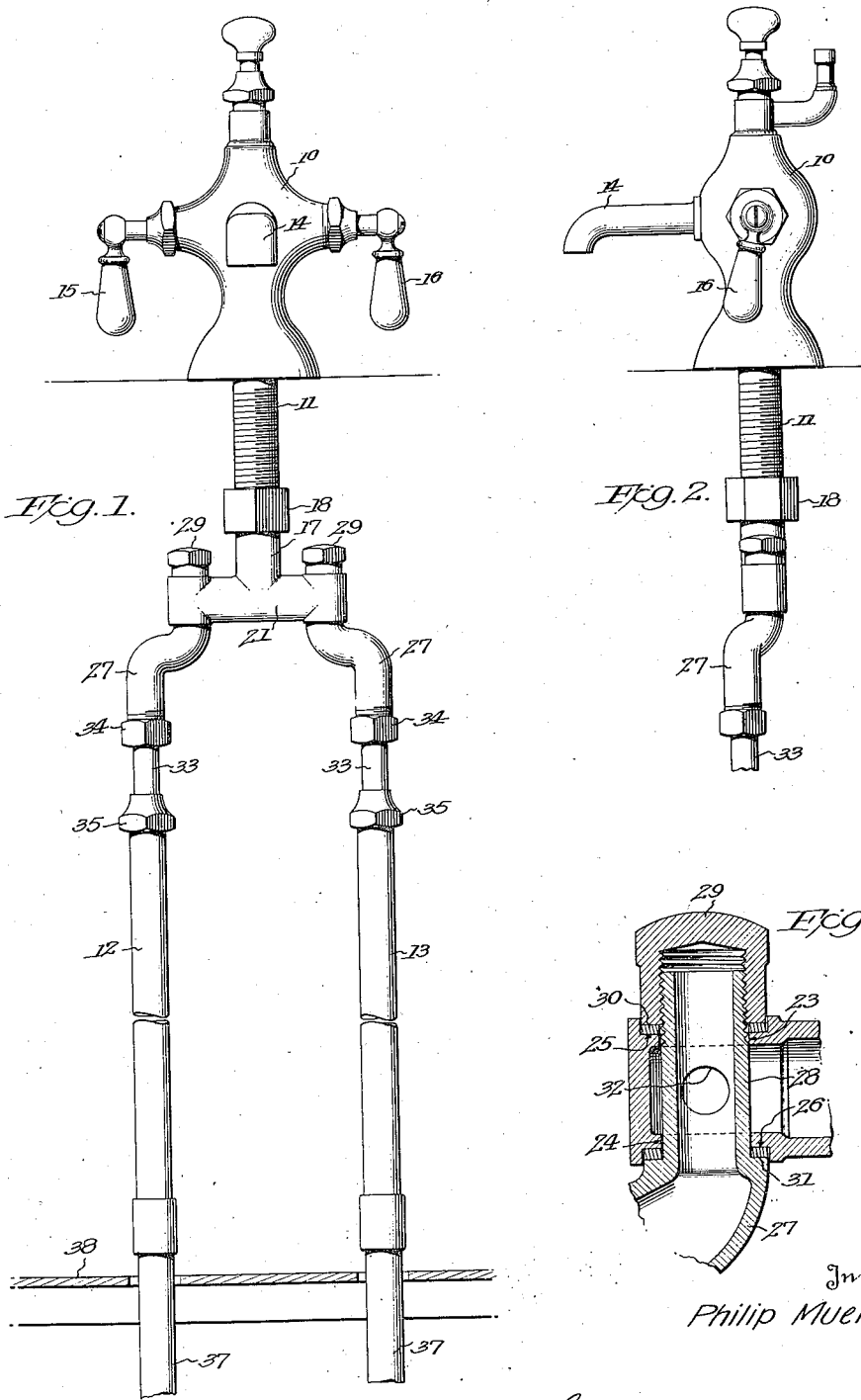
Inventor  
Philip Mueller  
By Cushman, Bryant & Darby  
Attorneys Nov. 16, 1926.

P. MUELLER

FAUCET CONNECTION

Filed April 28, 1923

Inventor
Philip Mueller
By Cushman, Bryant & Darby
Attorneys

Patented Nov. 16, 1926.

1,607,096

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FAUCET CONNECTION.

Application filed April 28, 1923. Serial No. 635,271.

The present invention relates to adjustable pipe connections, and more particularly to means for securing the shank of a double faucet to hot and cold water service pipes.

One of the essential features of my invention consists in providing an elbow connection for securing the service pipes to the shank fitting in such a manner that should the supply pipes not be properly spaced apart or off centered with respect to the faucet shank, a fluid tight connection can be effectively made without forcing or bending the service pipes, as is customarily required with the usual installation of this type.

It will be obvious that by reason of the present construction, wherein the supply pipes are connected to a shank fitting by means of swivelled elbows, which are adjustably connected to the fitting so as to be moved towards and away from each other to compensate for any inaccuracy that might have been caused in setting up the service pipes, that an efficient means is provided for securing the service and supply pipes to the faucet shank, which can be set up at a minimum cost of time and labor, and without bending or twisting the service and supply pipes in order to effectively couple the parts together.

Referring to the drawings, wherein is disclosed a preferred embodiment of my invention:

Figure 1 is a front elevation showing the adjustable connection between a double faucet shank and the supply pipes.

Figure 2 is a side elevation of Figure 1.

Figure 5 is an enlarged detail view showing the connection.

Figure 3:
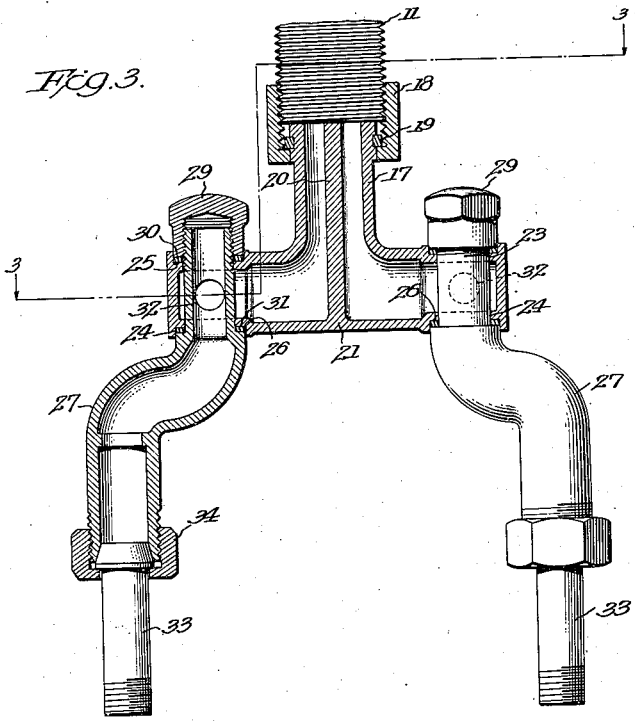
Figure 3 is a vertical sectional view of the connection, somewhat enlarged.

Referring to the drawings, wherein like numerals indicate like parts in the various figures, 10 denotes the body of a double faucet which is preferably provided with a threaded shank 11, through which the hot and cold water is conducted from the supply pipes 12 and 13 to the body of the faucet 10, where they can be mixed to any desired temperature or independently discharged through the nozzle 14 by means of the valve controlling handles 15 and 16.

A substantially T-shaped and hollow fitting 17 is detachably connected to the shank 11, preferably by the coupling nut 18 and the washer 19, as shown in Figure 3. The fitting 17 is provided with a vertical partition 20, which allows the supply from the pipes 12 and 13 to be independently and separately conducted to the mixing chamber in the faucet 10. The horizontal arm 21 of the fitting 17 is provided adjacent each of its opposed ends with aligned openings 23 and 24, provided on their outer edges with shouldered recesses 25 and 26. An elbow connection 27 having a reduced threaded end 28 is arranged to extend through each of the openings in the arm 21, and is adjustably secured thereto by the closure cap 29, which engages the threaded portion 28 of the elbow, and fits in the recess 23. In order to effectively obtain a water tight connection when the joint is set up, washers 30 and 31 are preferably arranged to seat in the shouldered recesses 25 and 26 so as to form a tight joint when the cap 29 is secured to the elbow 27. Each of the arms 28 of the elbows 27 are provided with an orifice 32, through which the water passes from the supply pipes to the fitting 17, and is conducted separately to the faucet 10.

The lower extremities of the elbows 27 are preferably connected to each of the supply pipes by means of the tail pieces 33, which are secured to the ends of the elbows 27 by the couplings 34 and to the adjacent ends of the supply pipes by the nuts 35.

While the installation has been conventionally shown as connected with the service pipes 37, which extend through the floor 38, it is perfectly obvious that the device can be applied to a basin faucet wherein the supply pipes are arranged to pass through the wall of a room instead of the floor. In fact, the adjustable connection is admirably suited to be applied to installations of the wall service type, since by reason of the horizontal adjustment of the elbows 27 relative to each other, a compact connection can be made with this swivel arrangement which occupies comparatively very little space.

Figure 4:
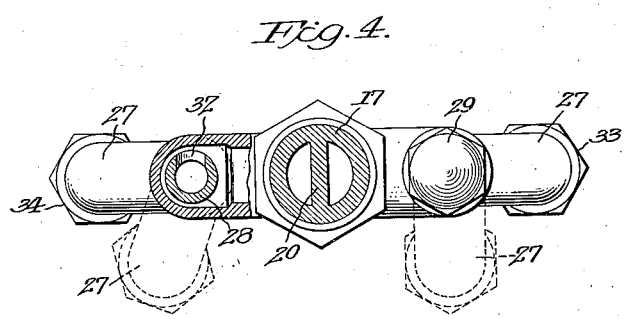
Figure 4 is a sectional view taken substantially along the line 4—4 of Figure 3.

It will be further noted that by reason of the swivel connection of the elbow 27 with the arm 21 of the fitting, the elbows can be adjusted longitudinally towards and away from each other as shown in dotted lines in Figure 4, in order to compensate for any inaccuracy or unevenness of the supply pipes 12 and 13 and their service pipes, with respect to the shank 11, without the necessity of bending or twisting the supply pipes, which has an inherent defect found in connections of this type, and which is overcome by the present invention. It is obvious that the forcing of the supply pipes into their proper position not only entailed an expenditure of considerable time and labor, but also resulted in an unsightly and defective connection.

While I have, for illustrative purposes set forth a preferred embodiment of my invention, and shown it connected with a double faucet, it is to be understood that the same is merely illustrative and not restrictive of the invention, since the device is applicable to a variety of different fixtures. Accordingly, mere mechanical changes in the construction of parts and adaptation of the device may be made without departing from the spirit of my invention and the scope of the appended claims.

I claim:

1. The combination with a faucet shank and two supply pipes, of a fitting secured to and communicating with the faucet shank, and an elbow connecting the fitting and each supply pipe and including terminal portions extending in parallel directions, the connection between the fitting and elbows permitting relative adjustment of the latter, for the purpose described.

2. The combination with a faucet shank and two supply pipes, of a substantially T-shaped fitting having its stem connected to and communicating with the faucet shank and having the outer ends of its arms closed, diametrically opposite openings being provided in each arm of said fitting, two elbows, the terminal portions of which extend in parallel directions, each having one end extending through the said openings in one of the arms of said fitting and having its other end provided with means for attachment to one of the supply pipes, and a cap closing the end of each elbow adjacent the fitting and acting to connect the elbow and fitting while permitting relative rotary adjustment between said parts, each elbow being provided within the fitting with a lateral outlet port.

3. The combination with a faucet shank and two supply pipes, of a substantially T-shaped fitting having its stem connected to and communicating with the faucet shank and having the outer ends of its arms closed, diametrically opposite openings being provided in each arm of said fitting, and an annular seat being formed in the fitting about the outer face of each said opening, two elbows each having means at one end for coupling it to one of the supply pipes and having its body reduced in diameter adjacent its opposite end, said reduced section extending through the aforesaid apertures in one arm of the fitting and being surrounded by a shoulder which fits within the seat about one of said openings, and a cap secured on and closing the outer end of the reduced section of the elbow with its end seated in the other aforesaid seat on the fitting arm, the reduced section of the elbow being provided within the fitting with a lateral outlet port.

In testimony whereof I have hereunto set my hand.

PHILIP MUELLER.